United States Patent
Badrieh et al.

(10) Patent No.: US 10,957,417 B2
(45) Date of Patent: Mar. 23, 2021

(54) ON-DIE MEMORY POWER ANALYTICS AND MANAGEMENT

(71) Applicant: Micron Technology, Inc., Boise, ID (US)

(72) Inventors: Fuad Badrieh, Boise, ID (US); Thomas H. Kinsley, Boise, ID (US); Baekkyu Choi, San Jose, CA (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 16/786,748

(22) Filed: Feb. 10, 2020

(65) Prior Publication Data

US 2020/0258593 A1    Aug. 13, 2020

Related U.S. Application Data

(60) Provisional application No. 62/804,329, filed on Feb. 12, 2019.

(51) Int. Cl.

| | |
|---|---|
| *G11C 29/54* | (2006.01) |
| *G11C 29/50* | (2006.01) |
| *G06F 30/367* | (2020.01) |
| *G06F 115/12* | (2020.01) |
| *G06F 119/06* | (2020.01) |

(52) U.S. Cl.
CPC ........... *G11C 29/54* (2013.01); *G06F 30/367* (2020.01); *G11C 29/50008* (2013.01); *G06F 2115/12* (2020.01); *G06F 2119/06* (2020.01)

(58) Field of Classification Search
CPC ..... H01L 25/16; G11C 29/54; G11C 29/5008; G11C 5/14; G06F 30/367; G06F 2115/12; G06F 2119/06
See application file for complete search history.

(56) References Cited

U.S. PATENT DOCUMENTS

| | | | |
|---|---|---|---|
| 2014/0068539 A1* | 3/2014 | Jung | ................. H01L 25/16 |
| | | | 716/115 |
| 2016/0172740 A1* | 6/2016 | Srirattana | ............ H01P 5/185 |
| | | | 333/111 |

* cited by examiner

*Primary Examiner* — Paul Dinh
(74) *Attorney, Agent, or Firm* — Holland & Hart LLP

(57) ABSTRACT

Systems, apparatuses, and methods for on-die memory power analytics and management are described. In some examples, the memory analytics and management may include a frequency-dependent analysis or simulation model of a memory die to determine an operating characteristic of the die. A set of ports of the memory die may be selected and one or more alternating current (AC) excitation signals may be applied to the ports to determine an impedance associated with the ports. The impedance may be used to determine one or more parameters (e.g., scattering, impedance) to analyze a die and for subsequently managing power distribution on the die. Analytics on a subset of ports on a die may be used to simulate the electrical response of the entire memory die and thus manage power delivery for the die.

25 Claims, 7 Drawing Sheets

ON-DIE MEMORY POWER ANALYTICS AND MANAGEMENT

CROSS REFERENCE

The present Application for Patent claims the benefit of U.S. Provisional Patent Application No. 62/804,329 by BADRIEH et al., entitled "ON-DIE MEMORY POWER ANALYTICS AND MANAGEMENT," filed Feb. 12, 2019, which is assigned to the assignee hereof, and which is expressly incorporated by reference in its entirety herein.

BACKGROUND

The following relates generally to simulation of electrical circuitry, and more specifically to a memory simulation tool for simulating the electrical response of a memory die.

Memory devices are widely used to store information in various electronic devices such as computers, cameras, digital displays, and the like. Information is stored by programming different states of a memory device. For example, binary devices have two states, often denoted by a logic "1" or a logic "0." In other systems, more than two states may be stored. To access the stored information, a component of the electronic device may read, or sense, the stored state in the memory device. To store information, a component of the electronic device may write, or program, the state in the memory device.

Various types of memory devices exist, including magnetic hard disks, random access memory (RAM), read-only memory (ROM), static RAM (SRAM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory (SSM), and others. Memory devices may be volatile or non-volatile. Non-volatile memory cells may maintain their stored logic state for extended periods of time even in the absence of an external power source. Volatile memory cells may lose their stored state over time unless they are periodically refreshed by an external power source.

A memory die (e.g., in a memory device) may include many thousands or even millions of electrical components such as resistors and capacitors. Simulating the electrical response of a memory die by simulating every component in the memory die may be prohibitively time-consuming.

DETAILED DESCRIPTION

Figure 1:
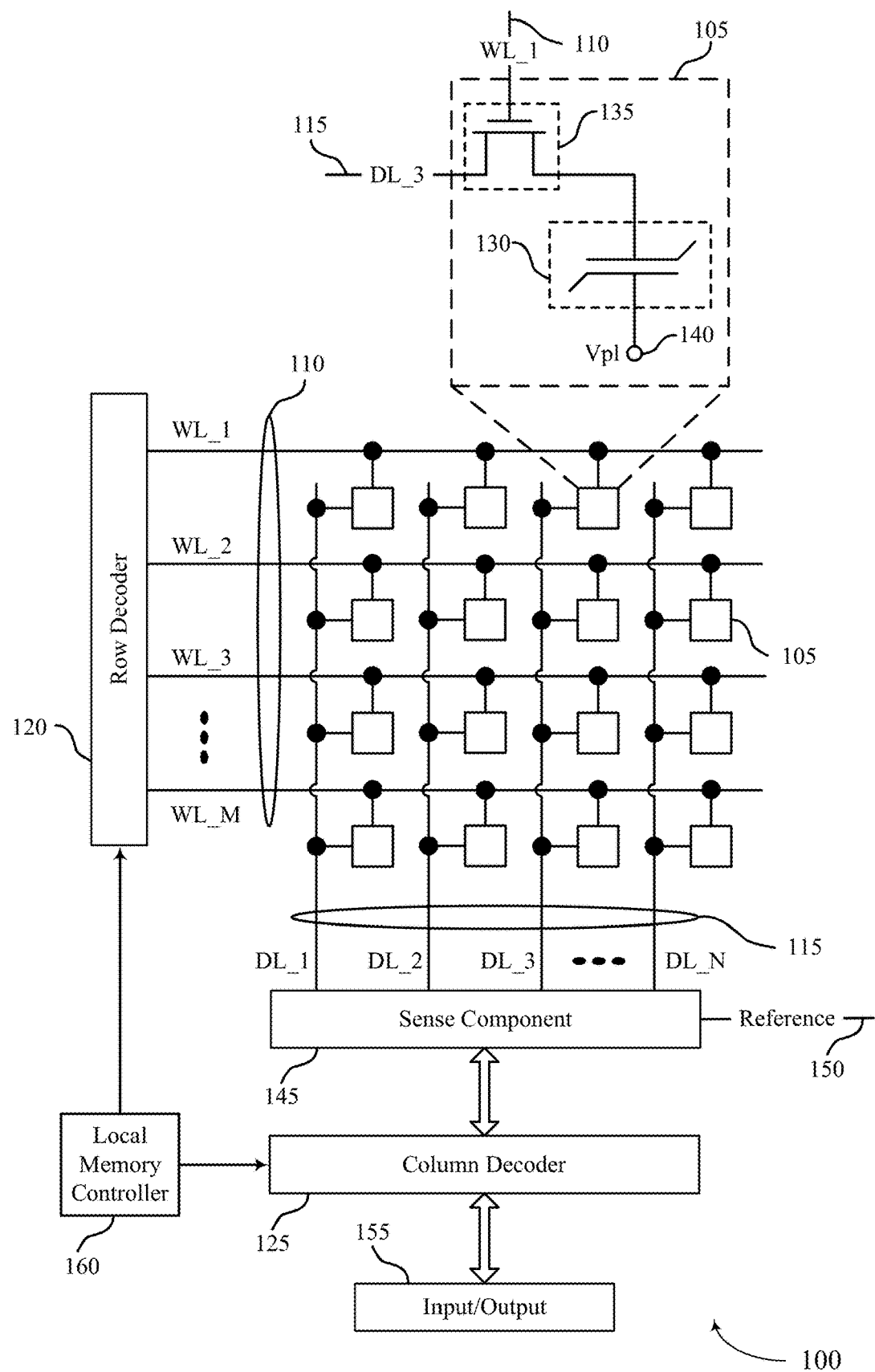
FIG. 1 illustrates an example memory die in accordance with examples disclosed herein.

A memory die may include a power distribution network (PDN) to distribute power across the memory die. For example, a memory die may include pads for receiving electrical power from one or more power supplies or voltages sources, and may distribute the power across the die using a grid of resistors and conductive wires, for example. In some cases, a memory die may experience a voltage drop between the pads of the memory die and various other components on the memory die during operation of the memory die, which may affect the performance of the components on the memory die. In some cases, it may be useful to measure or assess the voltage drop to ensure that various components receive sufficient power across a range of operating conditions of the memory die, to predict the voltage at the pads or elsewhere in the memory die, or for other purposes.

Thus, it may be desirable to develop a simulation model for the die that accurately simulates the electrical response of the die across a range of operating conditions in order to assess and characterize the PDN, predict the voltage drop between pads of the memory die and various components on the memory die, assess package and board designs that include the memory die, and/or predict voltages at the pads of the memory die, for example. Simulating the electrical response of a memory die, however, may be time-consuming and/or computationally intensive due to the large quantities of transistors, resistors, capacitors, conductive wires, etc. that may be included in the die, and because of the complexity associated with modeling the various current sources (e.g., circuit elements that may consume current, such as inverters, memory cells, or other circuit elements) that may be distributed throughout the die.

Moreover, the electrical response of the memory die may be frequency-dependent. Meaning that the resistivity, capacitance, and/or inductance of the memory die—each of which may affect the electrical response of the memory die—may vary depending on the frequency at which the die is operated.

For example, in some cases, a memory die may include multiple on-die decoupling capacitors located throughout the die and connected between the power supply rails, such as between VDD and VSS power supplies. Each decoupling capacitor may be charged to an initial voltage based on being connected between the power rails and may, under certain circumstances, provide additional voltage to the memory die for brief periods of time such as periods of high demand. During such periods, the decoupling capacitors may discharge some or all of their stored charge onto conductive lines of the memory die when the voltage of the conductive lines drops below a threshold. Such decoupling capacitors may therefore function as auxiliary power supplies for the memory die during such brief periods of high demand, and may, due to their frequency-dependent capacitance, contribute to the complexity of simulating the electrical response of the memory die and performing on-die power analytics and management.

As a result of these complexities, simulating the electrical response of the memory die by simply simulating every component in the memory die may result in simulations that take days or weeks to execute. Thus, in some cases, it may be desirable to determine a simplified simulation model of a memory die that may enable faster simulations of the memory die, both as a standalone component and within the context of a larger system such as a package or board. Such a model should provide a sufficiently accurate representation of the electrical response of the memory die while also enabling faster simulation.

In some cases, it may be sufficient to determine the electrical response of the die at specific ports of interest on the die, such as at the pads and at some or all of the current sources (e.g., circuitry that draws current) on the die. Thus, in some cases, a simplified simulation model of a memory die may be determined by selecting a subset of the ports on a memory die, applying one or more excitation signals (e.g., alternating current (AC) signals) to each of the selected ports, and determining an impedance associated with each of the selected ports by simulating or measuring a voltage or current produced at each of the selected ports in response to applying the excitation signal(s).

In some cases, the impedances associated with each of the ports may then be used to generate a simplified simulation model of the die that accurately models the electrical response at each of the selected ports without modeling the electrical response at the remaining ports on the die. That is, the simulation model may include (e.g., model) the selected ports of interest of the memory die while excluding the remaining ports on the memory die. In some cases, the impedances may be used to determine scattering parameters or impedance parameters to generate the simplified simulation model. The simulation model may represent or may be used to determine various operating characteristics of the memory die, including the electrical response of the memory die at the selected ports of interest.

In some cases, the simplified simulation model of the memory die may be coupled (e.g., using a simulation tool) with simulation models of one or more other components in the larger system such that a full simulation of the larger system may be performed in less time than may be used to execute a full simulation of the larger system using a representation of the complete memory die. Such simulation may be used to generate a set of data associated with operating the full system, such as data representing the electrical response of the memory die or system during operation. For example, the data may include values of current, voltage, impedance, or other parameters for each of the selected ports of interest while operating the system. The set of data may exclude such information for the remaining (non-selected) ports in the memory die. As previously noted, such values may be frequency-dependent. The set of data may be used to tune the system design, select different components, verify operating characteristics, or for other purposes.

Features of the disclosure introduced above are described herein in the context of a memory die or circuit as described with reference to FIGS. 1 and 2. Specific examples are then described for memory dice that include a PDN. These and other features of the disclosure are further illustrated by and described with reference to a process flow, apparatus diagrams, and a flowchart that relate to generating and using a simplified simulation model of a memory die for on-die power analytics and management as described with reference to FIGS. 3 through 7.

FIG. 1 illustrates an example of a memory die 100 in accordance with various examples of the present disclosure. In some cases, the memory die 100 may be referred to or be a portion of a memory chip, a memory device, or an electronic memory apparatus. The memory die 100 may include one or more memory cells 105 that are programmable to store different logic states. Each memory cell 105 may be programmable to store two or more states. For example, the memory cell 105 may be configured to store one bit of digital logic at a time (e.g., a logic 0 and a logic 1). In some cases, a single memory cell 105 (e.g., a multi-level memory cell) may be configured to store more than one bit of digit logic at a time (e.g., a logic 00, logic 01, logic 10, or a logic 12). A memory cell 105 may be a DRAM cell, an SRAM cell, a PCM cell, an FeRAM cell, or another type of memory cell, for example.

A memory cell 105 may store a charge representative of the programmable states in a capacitor. DRAM architectures, for example, may include a capacitor that includes a dielectric material to store a charge representative of the programmable state, as depicted in FIG. 1. In other memory architectures, other storage devices and components are possible. For example, nonlinear dielectric materials may be employed.

Operations such as reading and writing may be performed on memory cells 105 by activating or selecting access lines such as a word line 110 and/or a digit line 115. In some cases, digit lines 115 may also be referred to as bit lines. References to access lines, word lines and digit lines, or their analogues, are interchangeable without loss of understanding or operation. Activating or selecting a word line 110 or a digit line 115 may include applying a voltage to the respective line.

The memory die 100 may include the access lines (e.g., the word lines 110 and the digit lines 115) arranged in a grid-like pattern. Memory cells 105 may be positioned at intersections of the word lines 110 and the digit lines 115. By biasing a word line 110 and a digit line 115 (e.g., applying a voltage to the word line 110 or the digit line 115), a single memory cell 105 may be accessed at their intersection.

Accessing the memory cells 105 may be controlled through a row decoder 120 or a column decoder 125. For example, a row decoder 120 may receive a row address from the local memory controller 160 and activate a word line 110 based on the received row address. A column decoder 125 may receive a column address from the local memory controller 160 and may activate a digit line 115 based on the received column address. For example, the memory die 100 may include multiple word lines 110, labeled WL_1 through WL_M, and multiple digit lines 115, labeled DL_1 through DL_N, where M and N depend on the size of the memory array. Thus, by activating a word line 110 and a digit line 115, e.g., WL_1 and DL_3, the memory cell 105 at their intersection may be accessed. The intersection of a word line 110 and a digit line 115, in either a two-dimensional or three-dimensional configuration, may be referred to as an address of a memory cell 105.

The memory cell 105 may include a logic storage component, such as capacitor 130 and a switching component 135. The capacitor 130 may be an example of a dielectric capacitor or a ferroelectric capacitor. A first node of the capacitor 130 may be coupled with the switching component 135 and a second node of the capacitor 130 may be coupled with a voltage source 140. In some cases, the voltage source 140 may be the cell plate reference voltage, such as Vpl, or may be ground, such as Vss. In some cases, the voltage source 140 may be an example of a plate line coupled with a plate line driver. The switching component 135 may be an example of a transistor or any other type of switch device that selectively establishes or de-establishes electronic communication between two components.

Selecting or deselecting the memory cell 105 may be accomplished by activating or deactivating the switching component 135. The capacitor 130 may be in electronic communication with the digit line 115 using the switching component 135. For example, the capacitor 130 may be isolated from digit line 115 when the switching component 135 is deactivated, and the capacitor 130 may be coupled with digit line 115 when the switching component 135 is activated. In some cases, the switching component 135 is a transistor and its operation may be controlled by applying a voltage to the transistor gate, where the voltage differential between the transistor gate and transistor source may be greater or less than a threshold voltage of the transistor. In some cases, the switching component 135 may be a p-type transistor or an n-type transistor. The word line 110 may be in electronic communication with the gate of the switching component 135 and may activate/deactivate the switching component 135 based on a voltage being applied to word line 110.

A word line 110 may be a conductive line in electronic communication with a memory cell 105 that is used to perform access operations on the memory cell 105. In some architectures, the word line 110 may be in electronic communication with a gate of a switching component 135 of a memory cell 105 and may be configured to control the switching component 135 of the memory cell. In some architectures, the word line 110 may be in electronic communication with a node of the capacitor of the memory cell 105 and the memory cell 105 may not include a switching component.

A digit line 115 may be a conductive line that connects the memory cell 105 with a sense component 145. In some architectures, the memory cell 105 may be selectively coupled with the digit line 115 during portions of an access operation. For example, the word line 110 and the switching component 135 of the memory cell 105 may be configured to couple and/or isolate the capacitor 130 of the memory cell 105 and the digit line 115. In some architectures, the memory cell 105 may be in electronic communication (e.g., constant) with the digit line 115.

The sense component 145 may be configured to detect a state (e.g., a charge) stored on the capacitor 130 of the memory cell 105 and determine a logic state of the memory cell 105 based on the stored state. The charge stored by a memory cell 105 may be extremely small, in some cases. As such, the sense component 145 may include one or more sense amplifiers to amplify the signal output by the memory cell 105. The sense amplifiers may detect small changes in the charge of a digit line 115 during a read operation and may produce signals corresponding to a logic state 0 or a logic state 1 based on the detected charge. During a read operation, the capacitor 130 of memory cell 105 may output a signal (e.g., discharge a charge) to its corresponding digit line 115. The signal may cause a voltage of the digit line 115 to change. The sense component 145 may be configured to compare the signal received from the memory cell 105 across the digit line 115 to a reference signal 150 (e.g., reference voltage). The sense component 145 may determine the stored state of the memory cell 105 based on the comparison.

For example, in binary-signaling, if digit line 115 has a higher voltage than the reference signal 150, the sense component 145 may determine that the stored state of memory cell 105 is a logic 1 and, if the digit line 115 has a lower voltage than the reference signal 150, the sense component 145 may determine that the stored state of the memory cell 105 is a logic 0. The sense component 145 may include various transistors or amplifiers to detect and amplify a difference in the signals. The detected logic state of memory cell 105 may be output through column decoder 125 as output 155. In some cases, the sense component 145 may be part of another component (e.g., a column decoder 125, row decoder 120). In some cases, the sense component 145 may be in electronic communication with the row decoder 120 or the column decoder 125.

The local memory controller 160 may control the operation of memory cells 105 through the various components (e.g., row decoder 120, column decoder 125, and sense component 145). In some cases, one or more of the row decoder 120, column decoder 125, and sense component 145 may be co-located with the local memory controller 160. The local memory controller 160 may be configured to receive commands and/or data from an external memory controller or a device memory controller, translate the commands and/or data into information that can be used by the memory die 100, perform one or more operations on the memory die 100, and communicate data from the memory die 100 to an external memory controller (or a device memory controller) in response to performing the one or more operations. The local memory controller 160 may generate row and column address signals to activate the target word line 110 and the target digit line 115. The local memory controller 160 may also generate and control various voltages or currents used during the operation of the memory die 100. In general, the amplitude, shape, or duration of an applied voltage or current discussed herein may be adjusted or varied and may be different for the various operations discussed in operating the memory die 100.

In some cases, the electrical response of memory die 100 may be affected by transistors, resistors, capacitors, current sources (e.g., circuitry that may draw current), conductive lines, etc. included in memory die 100, such as may be included in decoders 120, 125, memory controller 160, sense component 145, memory cells 105, word lines 110, bit lines 115, etc. In some cases, the memory die 100 may include one or more decoupling capacitors that may serve as auxiliary power supplies for memory die 100 during brief periods of high demand. In some cases, memory die 100 may include pads that may enable memory die 100 to transmit or receive data, control signals, supply voltages, etc. from other components in a larger system that includes memory die 100, such as other components on a circuit board or a chip package that includes memory die 100.

In some cases, the local memory controller 160 may be configured to perform a write operation (e.g., a programming operation) on one or more memory cells 105 of the memory die 100. During a write operation, a memory cell 105 of the memory die 100 may be programmed to store a desired logic state. In some cases, a plurality of memory cells 105 may be programmed during a single write operation. The local memory controller 160 may identify a target memory cell 105 on which to perform the write operation. The local memory controller 160 may identify a target word line 110 and a target digit line 115 in electronic communication with the target memory cell 105 (e.g., the address of the target memory cell 105). The local memory controller 160 may activate the target word line 110 and the target digit line 115 (e.g., applying a voltage to the word line 110 or digit line 115), to access the target memory cell 105. The local memory controller 160 may apply a specific signal (e.g., voltage) to the digit line 115 during the write operation to store a specific state (e.g., charge) in the capacitor 130 of the memory cell 105, the specific state (e.g., charge) may be indicative of a desired logic state.

In some cases, the local memory controller 160 may be configured to perform a read operation (e.g., a sense operation) on one or more memory cells 105 of the memory die 100. During a read operation, the logic state stored in a memory cell 105 of the memory die 100 may be determined. In some cases, a plurality of memory cells 105 may be sensed during a single read operation. The local memory controller 160 may identify a target memory cell 105 on which to perform the read operation. The local memory controller 160 may identify a target word line 110 and a target digit line 115 in electronic communication with the target memory cell 105 (e.g., the address of the target memory cell 105). The local memory controller 160 may activate the target word line 110 and the target digit line 115 (e.g., applying a voltage to the word line 110 or digit line 115), to access the target memory cell 105. The target memory cell 105 may transfer a signal to the sense component 145 in response to biasing the access lines. The sense component 145 may amplify the signal. The local memory controller 160 may fire the sense component 145 (e.g., latch the sense component) and thereby compare the signal received from the memory cell 105 to the reference signal 150. Based on that comparison, the sense component 145 may determine a logic state that is stored on the memory cell 105. The local memory controller 160 may communicate the logic state stored on the memory cell 105 to an external memory controller (or a device memory controller) as part of the read operation.

In some cases, memory die 100 may include a PDN that includes resistive elements and capacitive elements, such as decoupling capacitors. The PDN may distribute power across the die, including to various current sources such as memory cells 105, decoders 120, 125, sense components 145, or other circuit elements on memory die 100 that may draw current from the PDN. In some cases, a simplified simulation model of memory die 100 may be generated, and may model the frequency-dependent electrical response of memory die 100 to enable rapid simulations of memory die 100. In some cases, the simplified simulation model of memory die 100 may represent or may be used to determine various operating characteristics of memory die 100, such as the currents, voltages, impedances, or other characteristics at various ports on memory die 100.

Figure 2:
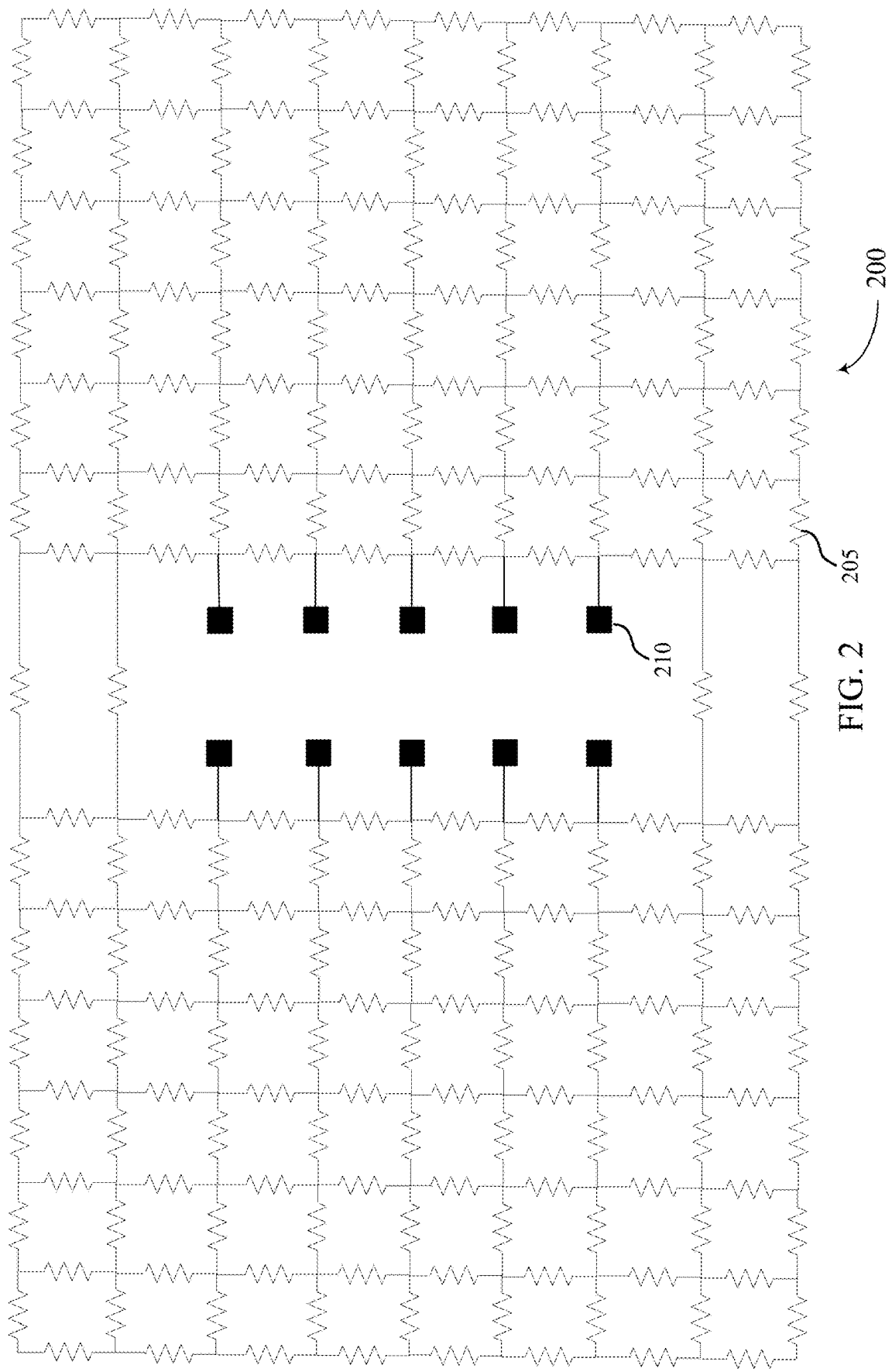
FIG. 2 illustrates an example of a circuit that may support on-die memory power analytics and management as disclosed herein.

FIG. 2 illustrates an example of a circuit 200 that may support on-die memory power analytics and management as disclosed herein. Circuit 200 may represent a portion of a memory die that may be modeled using a simplified simulation model as disclosed herein. In some examples, circuit 200 may provide a simplified representation of logical or physical resistive elements 205 (e.g., resistors or other elements that have resistive properties) and conductive wires that may be included in a PDN for a memory die, such as memory die 100.

Circuit 200 includes multiple resistive elements 205 that may be electrically coupled by conductive wires in a grid pattern. Thus, in some cases, circuit 200 may be referred to as a resistive grid. In some cases, a resistive grid in a memory die may include thousands of resistive elements 205. Circuit 200 includes multiple pads 210 coupled with resistive elements 205. In some cases, pads 210 may be tied (e.g., connected or coupled) to a voltage rail, such as a VSS, VCC, or VDD voltage rail, that provides power to the memory die. Thus, in some cases, circuit 200 may be referred to as (for example) a VSS grid, VCC grid, or VDD grid, respectively. Circuit 200 may distribute power received at pads 210 across the memory die, and thus may be part of a PDN of the memory die. In some cases, one or more pads 210 may be coupled with one or more corresponding pins (e.g., input/output connections) of a memory device or memory package, which may in turn be coupled with the voltage source that supplies the rail voltage.

In some cases, the electrical response of a memory die may be affected by the resistance or impedance of resistive elements 205. As discussed in more detail herein, in some cases, the impedance seen at each pad 210 may be determined by applying one or more excitation signals to each pad 210 and determining a corresponding impedance based on a voltage or current measured or simulated at each pad in response to the excitation signal. An excitation signal may be an AC signal, for example, that may be used to determine a frequency-dependent electrical response of a circuit, such as circuit 200.

Figure 3:
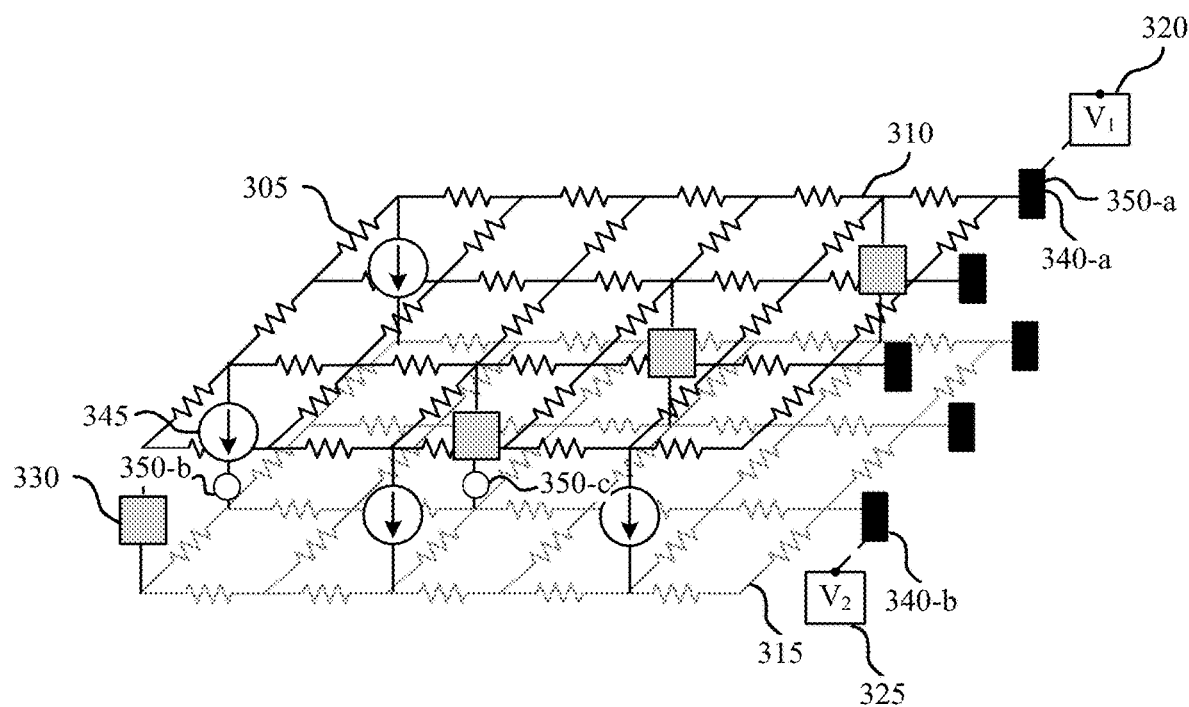
FIG. 3 illustrates an example of a circuit that may support on-die memory power analytics and management as disclosed herein.
Figure 3:
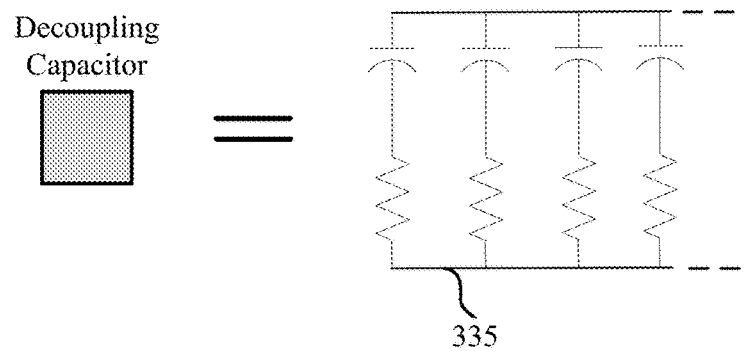

FIG. 3 illustrates an example of a circuit 300 that may support on-die memory power analytics and management as disclosed herein. Circuit 300 may represent a memory die that may be modeled using a simplified simulation model as disclosed herein. In some examples, circuit 300 may provide a representation of logical or physical resistive elements 305 (e.g., resistors or other elements having resistive properties), capacitive elements 330 (e.g., capacitors or other elements having capacitive properties), and current sources 345 (e.g., components or circuitry that may consume current) that may be included in a memory die, such as memory die 100. In some cases, such resistive elements 305, capacitive elements 330, and current sources 345 may affect the electrical response of a memory die. Resistive elements and capacitive elements may also contribute to intentional or parasitic impedance associated with memory die 100. Thus, circuit 300 may depict a resistive-capacitive (RC) or resistive-inductive-capacitive (RLC) representation of a memory die.

Circuit 300 may include multiple resistive elements 305 that may be coupled in a two-dimensional grid pattern; e.g., with an upper grid 310 and a lower grid 315. In some cases, the upper grid 310 may be tied to a first voltage rail (e.g., a first voltage source 320, such as a VSS source), and the lower grid 315 may be tied to a second (different) voltage rail (e.g., a second voltage source 325, such as a VDD source).

Circuit 300 may include multiple capacitive elements 330 that may be connected between the upper grid 310 and the lower grid 315. Capacitive elements 330 may include elements that are intentionally added to the circuit (such as discrete capacitors, including container capacitors, metal capacitors, complementary metal-oxide-semiconductor (CMOS) capacitors, etc.) to provide capacitance in circuit 300. Capacitive elements 330 may also include other types of elements that may contribute to parasitic capacitance in circuit 300. In some cases, capacitive elements 330 may not be ideal capacitors, and thus may each be modeled by or represented by an RC circuit 335. In some cases, the reactance of capacitive elements 330 may be frequency-dependent; thus, the overall impedance of circuit 300 may also be frequency-dependent. In some cases, full grids of components (e.g., resistive components, inductive components, and/or capacitive components) may be approximated using a frequency-dependent die model, which may model the voltage response across the die for various current stimuli. In some cases, the model may be used to try different capacitor models and/or different resistive/inductive grits to optimize on-die power delivery.

In some cases, capacitive elements 330 may include or may be examples of decoupling capacitors that may function as auxiliary power supplies to provide additional voltage (e.g., charge) to circuit 300 during brief periods of high demand.

Circuit 300 may include multiple pads 340-a, 340-b, one or more of which may be coupled with voltage sources 320, 325 to provide power to circuit 300. For example, one or more pads 340-a of upper grid 310 may be coupled with a first voltage source 320, and one or more pads 340-b of lower grid 315 may be coupled with a second (different) voltage source 325. In some cases, one or more pads 340 may be connected to pins of a memory package that may be coupled with voltage sources 320, 325.

Circuit 300 may include multiple current sources 345 that may be coupled with the upper grid 310 and the lower grid 315 and receive power from the upper grid 310 and/or the lower grid 315. Current sources 345 may be representations of components or circuitry in circuit 300 that may draw (e.g., consume) current from the PDN; e.g., from upper grid 310 and/or lower grid 315. Examples of current sources 345 may include memory cells (e.g., memory cell 105), decoders (e.g., row decoders 120 or column decoders 125), sense components (e.g., sense component 145), input/output circuitry (e.g., input/output 155), or other components or circuitry. Thus, current sources 345 may affect the electrical response of circuit 300 when input signals are received by circuit 300, including excitation signals. In some cases, the current sources 345 may be representations of ideal current sources or representations of actual circuit elements. In some cases, transient simulations using the frequency-dependent die model may be used to predict voltage droop in the die (using both ideal components and/or actual components in the model).

In some cases, a circuit or system designer may wish to determine a voltage drop between one or more pads 340 of circuit 300 and one or more current sources 345 of circuit 300. Such a determination may be useful for evaluating the performance of the PDN, for example, or for predicting the voltage at a pad 340 or current source 345. However, simulating all of the resistive elements, capacitive elements, and current sources of circuit 300 may be prohibitively time-consuming. Thus, it may be desirable to generate a simplified simulation model of circuit 300.

Circuit 300 includes multiple ports 350. In some cases, a port 350 may be referred to as a terminal or node of circuit 300. For example, a port 350 may be a pad 340 (e.g., port 350-a), or a node of a current source 345 (e.g., port 350-b), or a node of a capacitive element 330 (e.g., port 350-c), for example. In some cases, some or all of the nodes in a memory die 100 may be considered as ports 350 of the memory die 100. In some cases, a port 350 may be a representation of a voltage differential between two pads 340 that are connected to different resistive grids.

In some cases, certain ports 350 (e.g., particular ports of interest) on a memory die (e.g., a memory die including circuit 300) may be selected for determining (e.g., generating) a simplified simulation model of a memory die 100 and analyzing the electrical response of memory die 100.

In some cases, the selected set of ports may be a subset of a total quantity of ports of circuit 300 or memory die 100; that is, not every port 350 (e.g., node, terminal) of circuit 300 or memory die 100 may be used to determine the simplified model of memory die 100.

In some cases, the set of ports 350 may include certain nodes in circuit 300 that are of particular interest to the circuit or system designer; that is, the set of ports may be nodes at which a designer may desire to determine (e.g., measure) a voltage or current or apply a signal during a simulation of memory die 100. For example, the set of ports may include all of the pads 340 of circuit 300 and nodes of some or all of the current sources 345 of circuit 300. In other examples, the set of ports may include nodes for a set of current sources 345 that may be active during a particular operation of the memory cell, such as during a read or write operation, to enable subsequent analysis of the voltages or currents at these current sources 345 during a simulation of the particular operation.

While circuit 300 depicts two resistive grids 310, 315 at two different rails, in some cases, a memory die 100 may include multiple resistive grids at the same rail (e.g., coupled with voltage sources having the same voltage), or multiple rails sharing a voltage source (such as a VSS voltage source).

Figure 4:
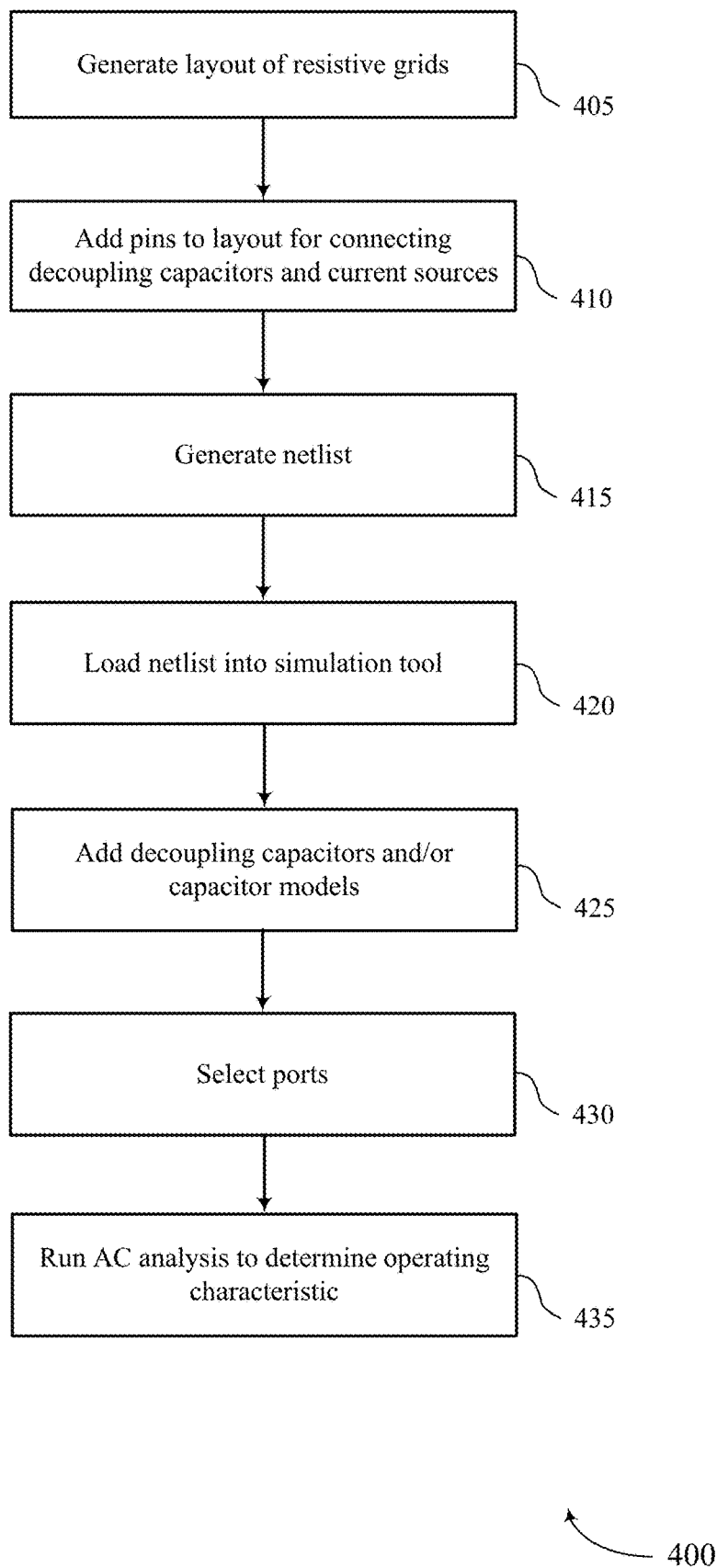
FIG. 4 illustrates an example of a process flow that may support on-die memory power analytics and management as disclosed herein.

In some cases, one or more excitation signals may be applied to the selected ports 350 to determine an impedance (e.g., including self-impedance and mutual impedance) at each port 350 and generate a simplified model of circuit 300 (or memory die 100), as described in more detail with respect to FIG. 4.

FIG. 4 illustrates an exemplary process flow 400 that may support on-die power analytics and management as described herein. Process flow 400 may be used for determining (e.g., generating) a simplified simulation model of a memory die (e.g., a frequency-dependent die model), such as a memory die 100 that may be represented by or include circuit 300, and/or for determining an operating characteristic of memory die 100. The process flow 400 may be performed by, for example, a circuit designer or a computing device configured to aid in designing a circuit, to generate the model of memory die 100 using various circuit design and simulation tools. Description of features related to resistance, resistors, resistive grids or the like may also be applied to inductance, inductors, inductive grids, or a combination of resistive and inductive components, and vice-versa. The process flow may be applied to a single stack die or a cube with multiple stacks.

At 405, the process flow may include generating a layout of the resistive grids of a memory die, such as resistive grids 310, 315 described with respect to FIG. 3. The layout of the resistive grids may be generated using a layout tool, or by drawing the metal grids manually or using an algorithm, or by extracting the power delivery grid from the full chip layout. Such techniques for generating the layout of resistive grids may be executed on or using a computing system such as computing system 500 described with respect to FIG. 5.

At 410, the process flow may include adding pins to the layout of the resistive grids to enable subsequent connection of decoupling capacitors and current sources, such as decoupling capacitors 330 and current sources 345 described with respect to FIG. 3. The pins may be added using the layout tool, for example. The pins may be used to enable connection of a die to one or more pads. In some cases, connection points may be coupled with the one or more pads, one or more current sources, one or more capacitors, one or more resistors, or any point at which a voltage may be probed, or a combination thereof.

At 415, the process flow may include generating a netlist representing metal objects (e.g., layers) and electrical components (e.g., resistors, capacitors, etc.) of memory die 100. The netlist may be a SPICE netlist, for example. (SPICE stands for Simulation Program with Integrated Circuit Emphasis, an open-source analog circuit simulation tool.) The netlist may include a representation of all of the components and interconnections of the resistive grids, for example. In some cases, the netlist may include two netlists, one for each resistive grid. The extraction may be performed using the layout tool, for example.

At 420, the process flow may include loading the netlist into a simulation tool. The simulation tool may be a tool capable of simulating the electrical response of a circuit, for example. The simulation tool may be a SPICE-compatible simulation tool, for example, that may be executed on a computing system such as computing system 500 described with respect to FIG. 5.

At 425, the process flow may include adding decoupling capacitors (e.g., decoupling capacitors 330) or models of decoupling capacitors (e.g., RC circuits 335) to the circuit using the simulation tool. The decoupling capacitors or models of the decoupling capacitors may be added to the circuit using the pins added at 410, for example.

At 430, the process flow may include selecting ports of the circuit (e.g., pads, nodes of current sources, or other nodes) for generating the simplified model. In some cases, the ports may be selected using the simulation tool by applying terminals at the selected pads and other nodes.

At 435, the process flow may include running an alternating current (AC) analysis of the circuit to determine an operating characteristic of the circuit; e.g., by generating a simplified model of the memory die. In some cases, running the AC analysis includes applying one or more excitation signals (e.g., AC signals) to the selected ports (e.g., at the selected pads and other nodes) using the terminals applied at 430 and determining the electrical response of the circuit by determining the self and mutual impedances at the ports. In some cases, running the AC analysis may include applying an excitation signal to each port (one at a time) while the remaining ports are open (e.g., unconnected) and measuring the voltage at the port as a function of frequency to determine the self-impedance and mutual impedance at the port as a function of frequency.

In some cases, running the AC analysis may include generating scattering parameters, impedance parameters, or admittance parameters that may be used to generate an S-par model, impedance model, or admittance model (respectively) of the memory die, which may be the simplified simulation model of the die. Such parameters may be generated based on the self-impedance and mutual impedance determined for each of the selected ports.

In some cases, the simplified model of the memory die may be a multi-port, frequency-dependent model that captures (e.g., models) one or more operating characteristics (e.g., the electrical behavior) of the memory die it represents. In some cases, the simplified model may include the selected ports, which may be used to supply or receive signals (e.g., voltages or currents) to or from the model during subsequent simulations, for example. In some cases, the simplified model may include or combine both resistive grids (e.g., the VDD and VSS domains, for example).

In some cases, the simplified model of the memory die (e.g., the frequency-dependent die model) may subsequently be used for system-level (e.g., package-level or board-level) simulations. For example, one or more ports of the simplified simulation model may be connected, using a simulation tool, with one or more other models representing one or more additional components in the package or system to enable system-level simulations. Fill system analysis may be performed using the combined models of the memory die and the package or printed circuit board. The system-level simulations may generate a set of data representing the electrical behavior of the system during the simulation; e.g., during operation of the system. In this manner, the overall system behavior may be simulated and analyzed. In some cases, the simplified model of the memory die may be used to simulate multiple different systems having different components, or may be used to re-simulate a system after one or more components have been changed. Such components may include, for example, capacitors, resistors, memory, processors, input/output circuitry, etc. In some cases, the memory die may be operated in combination with one or more other components according to the operating characteristic; e.g., the memory die may be operated in combination with the other components using various components, voltage supplies, etc. that may be determined based on the operating characteristic.

Figure 5:
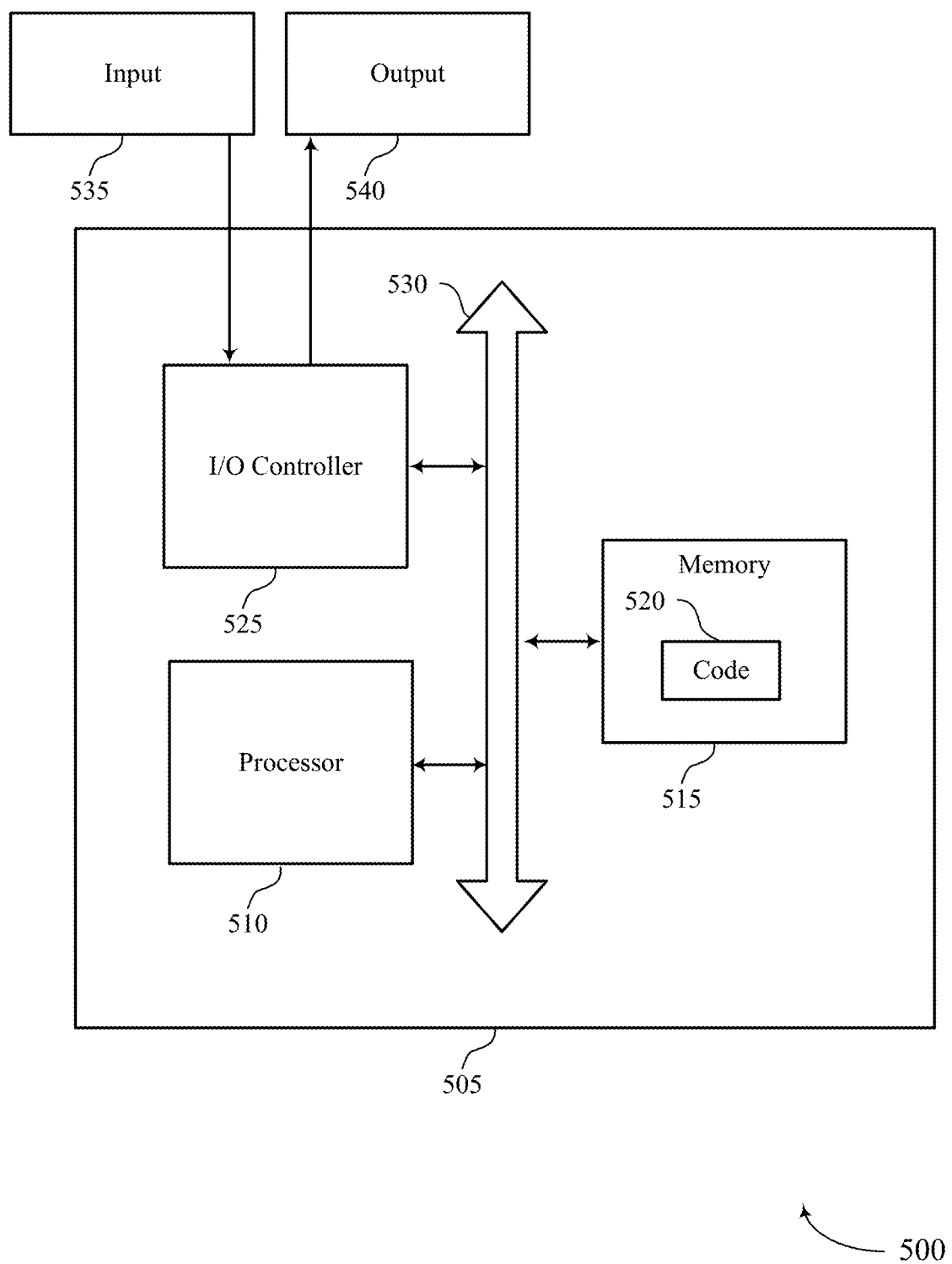
FIG. 5 shows a block diagram of a computing system that may support on-die memory power analytics and management as disclosed herein.

FIG. 5 depicts a diagram of a computing system 500 including a device 505 that supports a memory simulation tool for simulating the electrical response of a memory die using a simplified simulation model as disclosed herein. The device 505 may be an example of or include a computing device, a personal computer, a wireless device, or other device or component as described herein. The device 505 may include components for bi-directional data communications including components for transmitting and receiving communications, an I/O controller 525, a memory 515 that may store code 520, and a processor 510. These components may be in electronic communication via one or more buses (e.g., bus 530).

In some cases, I/O controller 525 may represent or interact with a modem, a keyboard, a mouse, a touchscreen, or a similar device. In some cases, the I/O controller 525 may be implemented as part of a processor. In some cases, a user may interact with the device 505 via the I/O controller 525 or via hardware components controlled by the I/O controller 525.

Memory 515 may include random-access memory (RAM) and read-only memory (ROM). The memory 515 may store computer-readable, computer-executable software (e.g., code 520) including instructions that, when executed, cause the processor to perform various functions described herein, such as applying signals to ports of a memory die, determining an impedance associated with ports of the memory die, simulating the electrical response of a system using the model of the memory die, extracting a circuit to generate a netlist, or running an AC analysis of the memory die, for example.

The processor 510 may include an intelligent hardware device, (e.g., a general-purpose processor, a digital signal processor (DSP), a central processing unit (CPU), a microcontroller, an application-specific integrated circuit (ASIC), a field programmable gate array (FPGA), a programmable logic device, a discrete gate or transistor logic component, a discrete hardware component, or any combination thereof). The processor 510 may be configured to execute computer-readable instructions stored in a memory 515 to perform various functions (e.g., functions or tasks that may support generation of a simplified simulation model of a memory die and/or simulations using the model).

Figure 6:
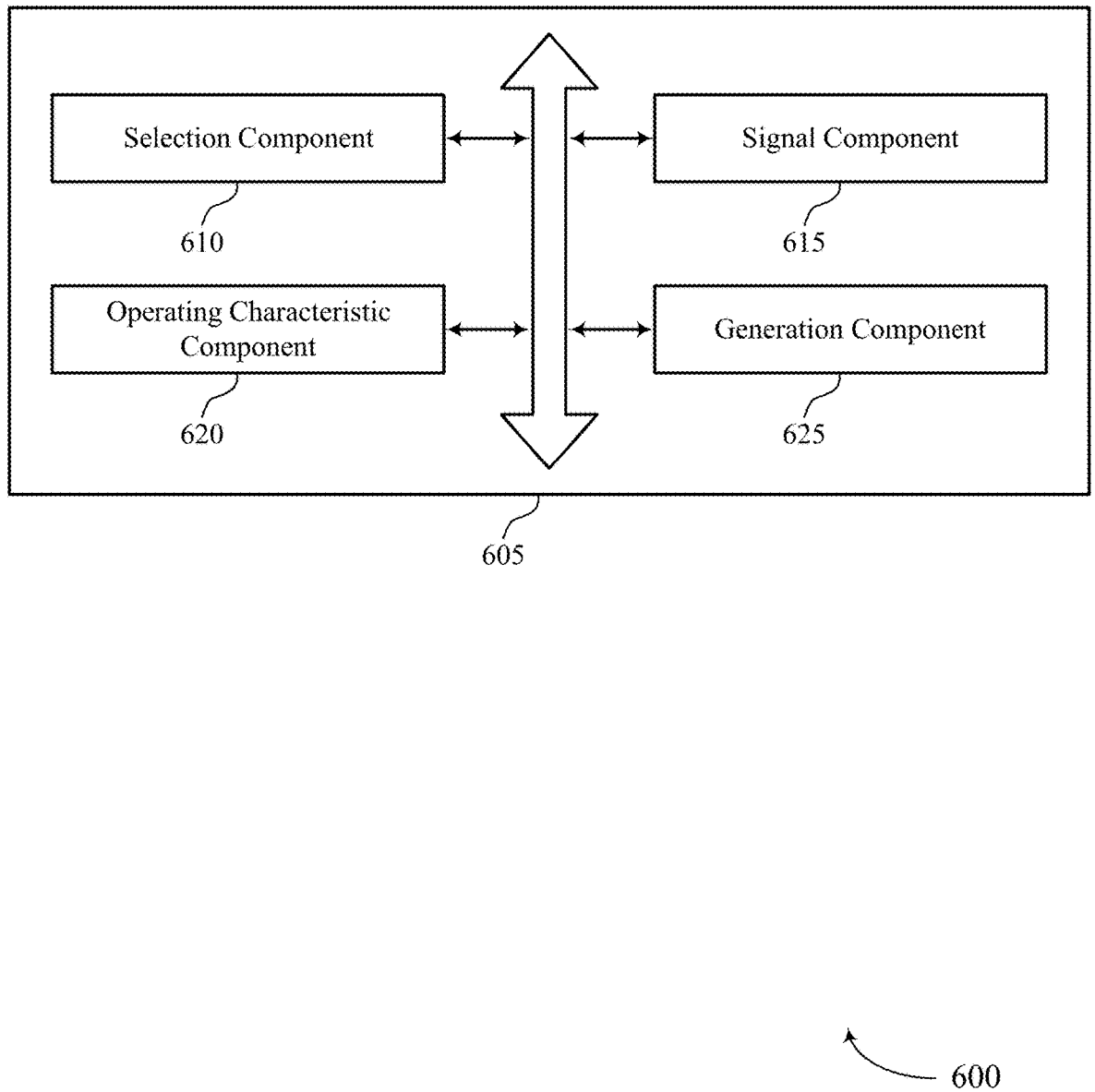
FIG. 6 illustrates a block diagram of a device that may support on-die memory power analytics and management as disclosed herein.

FIG. 6 shows a block diagram 600 of a device 605 that supports a memory simulation tool as disclosed herein. The device 605 may include a selection component 610, a signal component 615, an operating characteristic component 620, and a generation component 625. Each of these modules may communicate, directly or indirectly, with one another (e.g., via one or more buses).

The selection component 610 may select a set of ports of a memory die. In some examples, the set of ports is a subset of a total quantity of ports of the memory die.

The signal component 615 may apply one or more signals to each port of the set to determine an impedance associated with each port.

The operating characteristic component 620 may determine, based on an impedance associated with each port, and operating characteristic of the memory die. In some examples, the operating characteristic of the memory die may include the electrical response of the memory die.

The generation component 625 may generate, based on the operating characteristic, a set of data associated with operating a system that includes the memory die and at least one other component. In some examples, the set of data may include voltages, currents, impedances, or other electrical parameters that may be simulated or measured at each of the selected ports during operation of the system.

Figure 7:
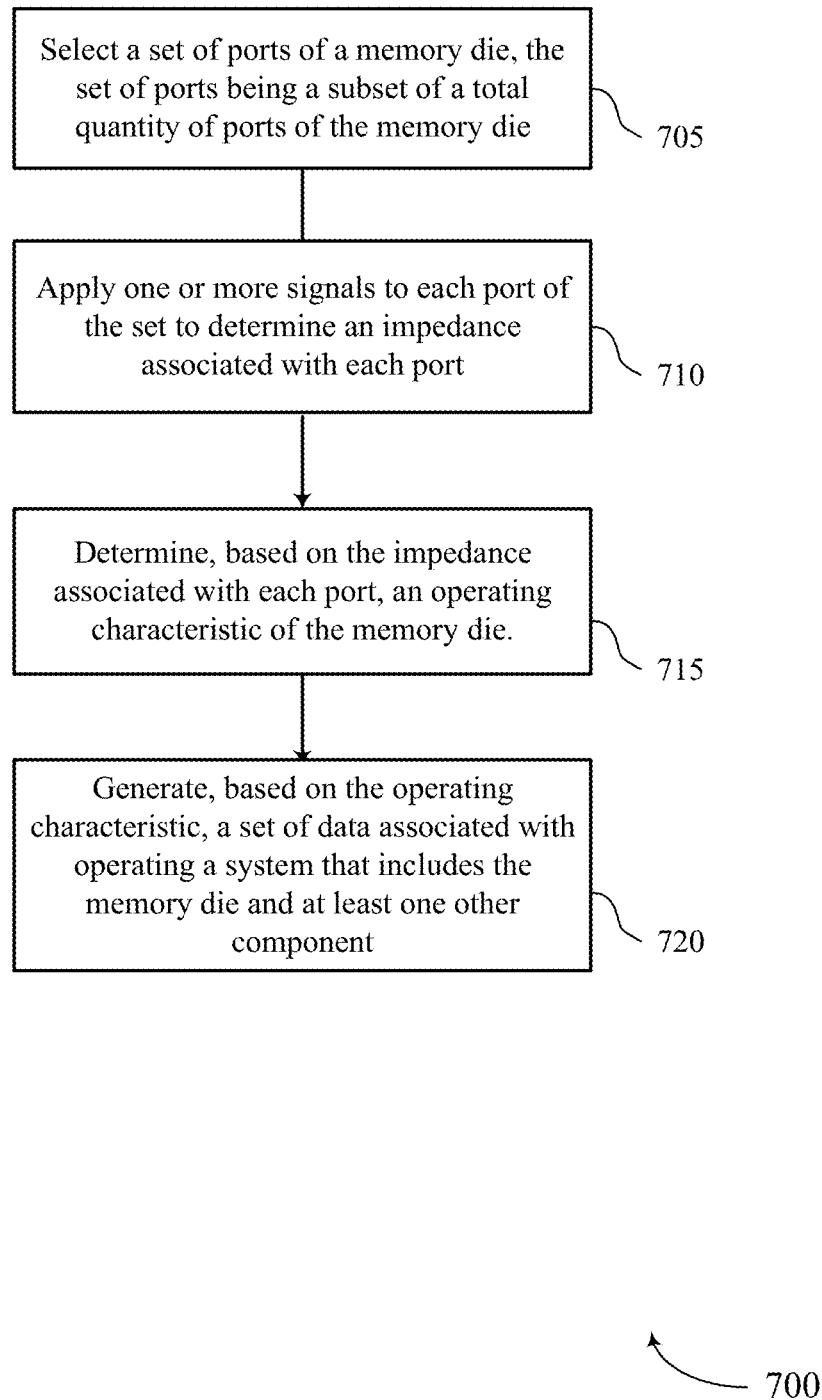
FIG. 7 illustrates a method or methods that may support on-die memory power analytics and management as disclosed herein.

FIG. 7 shows a flowchart illustrating a method 700 for generating and using a simulation model of a memory die in a memory simulation tool as disclosed herein. In some examples, the method 700 may be implemented or performed by a computing system 500 or device 505 as described with reference to FIG. 5 and/or a device 605 as described with reference to FIG. 6.

At 705, the method may include selecting a set of ports of a memory die, the set of ports being a subset of a total quantity of ports of the memory die. In some examples, aspects of the operations of 705 may be performed using a computing system as described with reference to FIG. 5.

At 710, the method may include applying one or more signals to each port of the set of ports to determine an impedance associated with each port. In some examples, aspects of the operations of 705 may be performed using a computing system as described with reference to FIG. 5.

At 715, the method may include determining, based at least in part on the impedance associated with each port, an operating characteristic of the memory die. In some examples, aspects of the operations of 705 may be performed using a computing system as described with reference to FIG. 5.

At 720, the method may include generating, based at least in part on the operating characteristic, a set of data associated with operating a system that includes the memory die and at least one other component. In some examples, aspects of the operations of 705 may be performed using a computing system as described with reference to FIG. 5.

It should be noted that the methods described herein describe possible implementations, and that the operations and the steps may be rearranged or otherwise modified and that other implementations are possible. Further, aspects from two or more of the methods may be combined.

In some examples, an apparatus or apparatuses as described herein may perform a method or methods, such as the method 700. The apparatus may include features, controllers, circuits, means, or instructions (e.g., a non-transitory computer-readable medium storing instructions executable by a processor) for selecting a set of ports of a memory die, the set of ports being a subset of a total quantity of ports of the memory die, and applying one or more signals to each port of the set to determine an impedance associated with each port. The method may include determining, based on an impedance associated with each port, an operating characteristic of the memory die, and generating, based on the operating characteristic, a set of data associated with operating a system that includes the memory die and at least one other component.

Some examples of the method, apparatuses, and non-transitory computer-readable medium described herein may further include operations, features, controllers, circuits, means, or instructions for determining, based on applying the one or more signals, the impedance associated with each port.

Some examples of the method, apparatuses, and non-transitory computer-readable medium described herein may further include operations, features, controllers, circuits, means, or instructions for determining scattering parameters associated with the subset of the total quantity of ports based on applying the one or more signals, where determining the operating characteristic of the memory die is based on determining the scattering parameters. In some cases, the operating characteristic of the memory die is determined based on the scattering parameters.

Some examples of the method, apparatuses, and non-transitory computer-readable medium described herein may further include operations, features, controllers, circuits, means, or instructions for determining impedance parameters associated with the subset of the total quantity of ports based at least in part on applying the one or more signals, wherein determining the operating characteristic of the memory die is based at least in part on determining the impedance parameters. In some cases, the operating characteristic of the memory die is determined based on the impedance parameters.

Some examples of the method, apparatuses, and non-transitory computer-readable medium described herein may further include operations, features, controllers, circuits, means, or instructions for selecting, based on the set of data, a second component, and generating, based on the operating characteristic, a second set of data associated with operating a second system that includes the memory die and the second component Some examples of the method, apparatuses, and non-transitory computer-readable medium described herein may further include operations, features, controllers, circuits, means, or instructions for connecting, using a simulation component, at least a portion of the representation of the subset of the total quantity of ports with at least a second model corresponding to the at least one other component.

In some examples of the method, apparatuses, and non-transitory computer-readable medium described herein, the system includes a chip package that includes the memory die and the at least one other component.

In some examples of the method, apparatuses, and non-transitory computer-readable medium described herein, the system includes a circuit board that includes the memory die and the at least one other component.

In some examples of the method, apparatuses, and non-transitory computer-readable medium described herein, the operating characteristic of the memory die includes a frequency-dependent resistive and capacitive (RC) characteristic of the memory die.

In some examples of the method, apparatuses, and non-transitory computer-readable medium described herein, the operating characteristic of the memory die includes a frequency-dependent inductive characteristic of the memory die.

Some examples of the method, apparatuses, and non-transitory computer-readable medium described herein may further include operations, features, controllers, circuits, means, or instructions for determining, based on the impedance associated with each port, a model of the memory die that includes a representation of the subset of the total quantity of ports and excludes a representation of a second subset of ports of the total quantity of ports different than the subset of the total quantity of ports, where generating the set of data includes simulating an electrical behavior of the memory die using the model of the memory die.

Some examples of the method, apparatuses, and non-transitory computer-readable medium described herein may further include operations, features, controllers, circuits, means, or instructions for operating the memory die in combination with the at least one other component according to the determined operating characteristic.

An apparatus is described. In some examples, the apparatus may include a processor, memory in electronic communication with the processor, and instructions stored in the memory. The instructions may be operable to cause the processor to receive an indication of a selection of a plurality of ports of a memory die, the plurality of ports being a subset of a total quantity of ports of the memory die, apply one or more signals to each port of the plurality to determine an impedance associated with each port, determine, based at least in part on an impedance associated with each port, an operating characteristic of the memory die, and generate, based at least in part on the operating characteristic, a set of data associated with operating a system comprising the memory die and at least one other component.

In some examples, the instructions may be operable to cause the processor to determine, based at least in part on applying the one or more signals, the impedance associated with each port. In some examples, the instructions may be operable to cause the processor to generate, based at least in part on the operating characteristic, a second set of data associated with operating a second system comprising the memory die and a second component different than the at least one other component.

In some examples, the instructions may be operable to cause the processor to determine scattering parameters associated with the subset of the total quantity of ports based at least in part on applying one or more signals, and wherein the instructions operable to cause the processor to determine the operating characteristic of the memory die are operable to cause the processor to determine the operating characteristic of the memory die based at least in part on the scattering parameters. In some examples, the instructions may be operable to cause the processor to determine impedance parameters associated with the subset of the total quantity of ports based at least in part on applying one or more signals, and wherein the instructions operable to cause the processor to determine the operating characteristic of the memory die are operable to cause the processor to determine the operating characteristic of the memory die based at least in part on the impedance parameters.

In some examples, the operating characteristic of the memory die indicates frequency-dependent resistive and capacitive (RC) characteristics of the memory die. In some examples, the instructions may be operable to cause the processor to determine, based at least in part on the impedance associated with each port, a model of the memory die comprising a representation of the subset of the total quantity of ports and excluding a representation of a second subset of ports of the total quantity of ports different than the subset of the total quantity of ports, wherein generating the set of data comprises simulating an electrical behavior of the memory die using the model of the memory die.

Information and signals described herein may be represented using any of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some cases, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some cases, the substrate is a semiconductor wafer. In other cases, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    selecting, for an electrical simulation of a memory die, a plurality of ports of the memory die, the plurality of ports being a subset of a total quantity of ports of the memory die;
    applying, during an electrical simulation of the memory die, one or more signals to each port of the plurality to determine an impedance associated with each port;
    determining, based at least in part on an impedance associated with each port, an operating characteristic of the memory die; and generating, based at least in part on the operating characteristic, a set of data associated with operating at least the memory die, wherein the set of data represents an electrical response of the memory die and one or more parameters for each of the selected plurality of ports.

2. The method of claim 1, further comprising:
determining, based at least in part on applying the one or more signals, the impedance associated with each port.

3. The method of claim 1, further comprising:
determining one or more scattering parameters associated with the subset of the total quantity of ports based at least in part on applying the one or more signals, wherein determining the operating characteristic of the memory die is based at least in part on determining the one or more scattering parameters.

4. The method of claim 1, further comprising:
determining impedance parameters associated with the subset of the total quantity of ports based at least in part on applying the one or more signals, wherein determining the operating characteristic of the memory die is based at least in part on determining the impedance parameters.

5. The method of claim 1, further comprising:
selecting, based on the set of data, a second component; and
generating, based at least in part on the operating characteristic, a second set of data associated with operating a second system comprising the memory die and the second component.

6. The method of claim 1, wherein the system comprises a chip package comprising the memory die and at least one other component.

7. The method of claim 1, wherein the system comprises a circuit board comprising the memory die and at least one other component.

8. The method of claim 1, wherein the operating characteristic of the memory die includes a frequency-dependent resistive and capacitive (RC) characteristic of the memory die.

9. The method of claim 1, wherein the operating characteristic of the memory die includes a frequency-dependent inductive characteristic of the memory die.

10. The method of claim 1, further comprising:
determining, based at least in part on the impedance associated with each port, a model of the memory die comprising a representation of the subset of the total quantity of ports and excluding a representation of a second subset of ports of the total quantity of ports different than the subset of the total quantity of ports, wherein generating the set of data comprises simulating an electrical behavior of the memory die using the model of the memory die.

11. The method of claim 1, further comprising:
operating the memory die in combination with at least one other component according to the determined operating characteristic.

12. A non-transitory computer-readable medium storing instructions operable to cause a processor to:
receive, for an electrical simulation of a memory die, an indication of a selection of a plurality of ports of the memory die, the plurality of ports being a subset of a total quantity of ports of the memory die;
determine, based at least in part on an impedance associated with each port of the selected plurality of ports, an operating characteristic of the memory die; and
generate, based at least in part on the operating characteristic, a set of data associated with operating at least the memory die, wherein the set of data represents an electrical response of the memory die and one or more parameters for each of the selected plurality of ports.

13. The non-transitory computer-readable medium of claim 12, wherein the instructions are operable to cause the processor to:
apply, during an electrical simulation of a memory die, one or more signals to each port of the plurality;
determine, based at least in part on applying the one or more signals, the impedance associated with each port.

14. The non-transitory computer-readable medium of claim 12, wherein the instructions are operable to cause the processor to:
generate, based at least in part on the operating characteristic, a second set of data associated with operating a second system comprising the memory die and a second component.

15. The non-transitory computer-readable medium of claim 12, wherein the instructions are operable to cause the processor to:
determine one or more scattering parameters associated with the subset of the total quantity of ports based at least in part on applying one or more excitation signals, wherein the instructions that are operable to cause the processor to determine the operating characteristic of the memory die are operable to cause the processor to determine the operating characteristic of the memory die based at least in part on the one or more scattering parameters.

16. The non-transitory computer-readable medium of claim 12, wherein the instructions are operable to cause the processor to:
determine impedance parameters associated with the subset of the total quantity of ports based at least in part on applying one or more excitation signals, wherein the instructions that are operable to cause the processor to determine the operating characteristic of the memory die are operable to cause the processor to determine the operating characteristic of the memory die based at least in part on the impedance parameters.

17. The non-transitory computer-readable medium of claim 12, wherein the operating characteristic of the memory die indicates frequency-dependent resistive and capacitive (RC) characteristics of the memory die.

18. The non-transitory computer-readable medium of claim 12, wherein the instructions are operable to cause the processor to:
determine, based at least in part on the impedance associated with each port, a model of the memory die comprising a representation of the subset of the total quantity of ports and excluding a representation of a second subset of ports of the total quantity of ports different than the subset of the total quantity of ports, wherein generating the set of data comprises simulating an electrical behavior of the memory die using the model of the memory die.

19. An apparatus comprising:
a processor;
memory in electronic communication with the processor, and
instructions stored in the memory, the instructions operable to cause the processor to:
receive, for an electrical simulation of the memory die, an indication of a selection of a plurality of ports of the memory die, the plurality of ports being a subset of a total quantity of ports of the memory die;

apply, during an electrical simulation of the memory die, one or more signals to each port of the plurality to determine an impedance associated with each port;

determine, based at least in part on an impedance associated with each port, an operating characteristic of the memory die; and generate, based at least in part on the operating characteristic, a set of data associated with operating at least the memory die, wherein the set of data represents an electrical response of the memory die and one or more parameters for each of the selected plurality of ports.

20. The apparatus of claim 19, wherein the instructions are operable to cause the processor to:

determine, based at least in part on applying the one or more signals, the impedance associated with each port.

21. The apparatus of claim 19, wherein the instructions are operable to cause the processor to:

generate, based at least in part on the operating characteristic, a second set of data associated with operating a second system comprising the memory die and a second component different than at least one other component.

22. The apparatus of claim 19, wherein the instructions are operable to cause the processor to:

determine one or more scattering parameters associated with the subset of the total quantity of ports based at least in part on applying one or more signals, and wherein the instructions operable to cause the processor to determine the operating characteristic of the memory die are operable to cause the processor to determine the operating characteristic of the memory die based at least in part on the one or more scattering parameters.

23. The apparatus of claim 19, wherein the instructions are operable to cause the processor to:

determine impedance parameters associated with the subset of the total quantity of ports based at least in part on applying one or more signals, and wherein the instructions operable to cause the processor to determine the operating characteristic of the memory die are operable to cause the processor to determine the operating characteristic of the memory die based at least in part on the impedance parameters.

24. The apparatus of claim 19, wherein the operating characteristic of the memory die indicates frequency-dependent resistive and capacitive (RC) characteristics of the memory die.

25. The apparatus of claim 19, wherein the instructions are operable to cause the processor to:

determine, based at least in part on the impedance associated with each port, a model of the memory die comprising a representation of the subset of the total quantity of ports and excluding a representation of a second subset of ports of the total quantity of ports different than the subset of the total quantity of ports, wherein generating the set of data comprises simulating an electrical behavior of the memory die using the model of the memory die.

\* \* \* \* \*